June 12, 1962 A. A. ORTIZ 3,038,962

LINE FEED DETECTOR

Filed March 8, 1961 3 Sheets-Sheet 1

INVENTOR.
ANDRE A. ORTIZ

BY R. H. Henderson

ATTORNEY

June 12, 1962 A. A. ORTIZ 3,038,962

LINE FEED DETECTOR

Filed March 8, 1961 3 Sheets-Sheet 2

INVENTOR.
ANDRE A. ORTIZ
BY R. H. Henderson
ATTORNEY

LINE FEED DETECTOR

Filed March 8, 1961 3 Sheets-Sheet 3

INVENTOR.
ANDRE A. ORTIZ
BY H. Henderson
ATTORNEY

United States Patent Office 3,038,962

Patented June 12, 1962

3,038,962
LINE FEED DETECTOR

Andre A. Ortiz, Elmhurst, N.Y., assignor to The Western Union Telegraph Company, New York, N.Y., a corporation of New York Filed Mar. 8, 1961, Ser. No. 94,195
6 Claims. (Cl. 178—42)

This invention relates to printing telegraph equipment and more particularly to a novel accessory for detecting paper feed in unattended telegraph printers.

The recent increase in popularity of private line printing telegraph communication systems for business use has caused a large number of telegraph printers to be placed in the hands of clerical personnel having other than their part time telegraph duties to perform, so that the equipment is left unattended for substantial periods of time although it is still expected to remain in condition for the reception of telegraph messages whenever they may arrive.

Failure of the record paper to feed upwardly in the telegraph printer can be caused either by mechanical failure of the feeding mechanism, or by jamming of the paper, or by running out of paper. All of these conditions are immediately apparent to the receiving operator when in attendance on the machine, but when the machine is unattended there is no way for the sending operator to be aware that such conditions may have occurred and as a result of this, messages have been lost, and unwarranted time spent in repeating groups of messages.

It is therefore an object of this invention to provide an accessory for the printing telegraph whereby failure of paper feed is detectable.

It is a further object of the invention to provide automatic means for supplying paper feed information to the sending station.

It is a further object of the invention to provide such an accessory which requires no attention or manipulation in its operation.

These and other objects of the invention I attain by means of a novel paper motion detector which is automatically armed by the receipt of a coded conditioning signal over the telegraph line, and which then generates an appropriate signal indicative of correct paper motion thereafter, so that transmission may begin, or if no such signal is generated due to failure of paper, so that corrective action may be taken in advance of transmission.

A clearer understanding of the invention may be had by reference to the following detailed description of a specific illustrative example of a preferred embodiment thereof and to the drawings, wherein.

Figure 1:
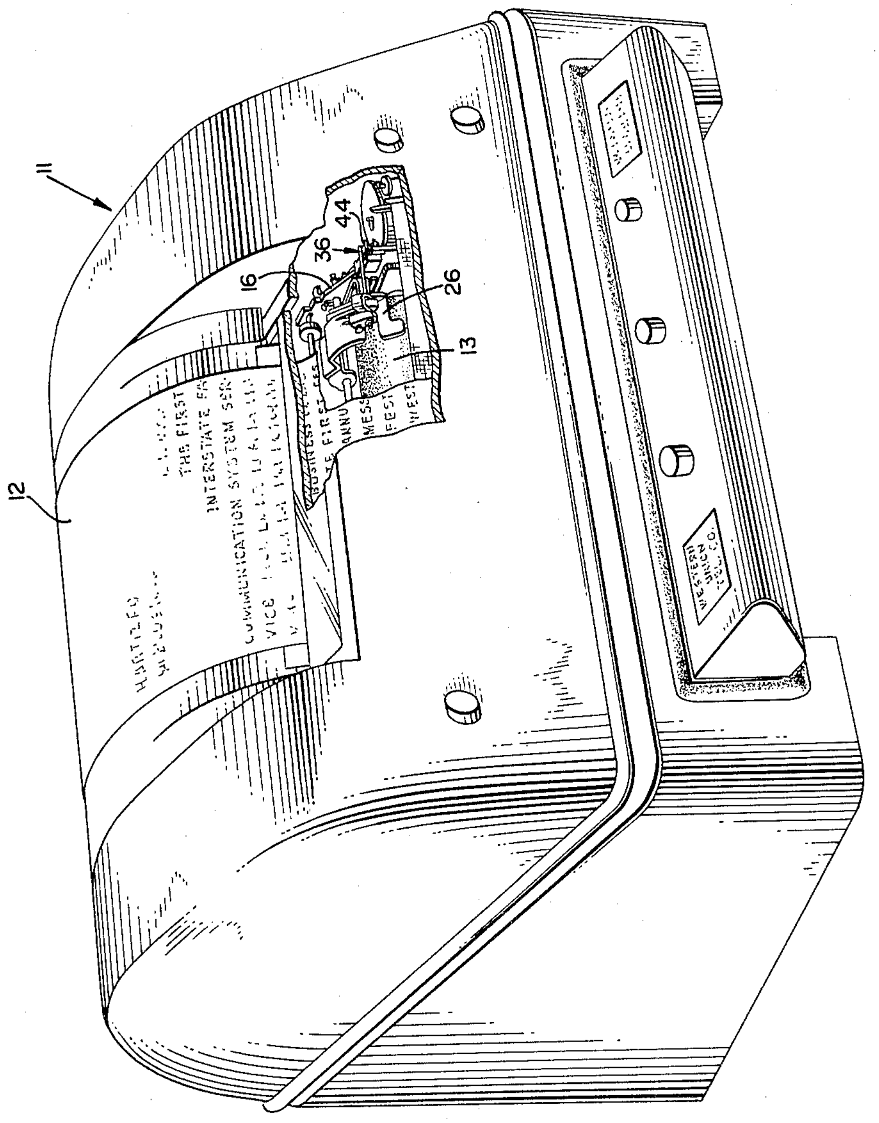
FIG. 1 is a perspective view of a printing telegraph receiving machine.

Referring now to the drawings, there is seen in FIG. 1 a view of an automatic telegraph page printer of common kind and designated 11, which prints characters on a sheet of paper 12 which is fed upwardly in line-by-line fashion at such times as the platen 13 is rotated upon reception of a telegraphic line feed signal.

Figure 2:
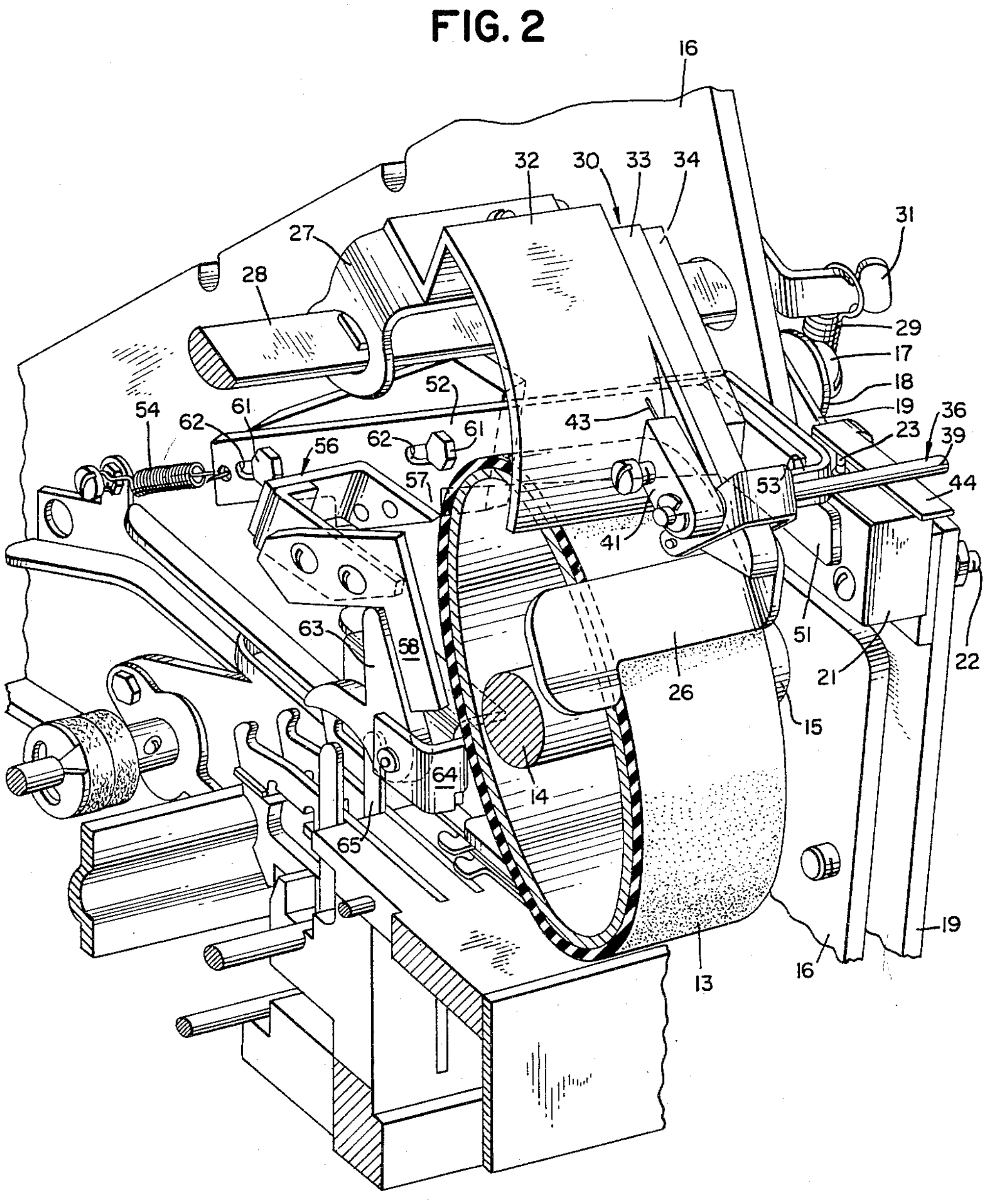
FIG. 2 is a perspective view of an internal portion of FIG. 1.

A cut-away portion of the cover 14 reveals said platen 13 and the associated mechanism seen in proximity thereto, and more clearly visible in FIG. 2, which comprises the present invention.

Turning to FIG. 2, there is seen the right hand end of the platen 13, the remainder thereof being deleted for the sake of clarity of the drawings, a core 14 of said roller being journalled in the bushing 15 mounted in the end frame 16 of the printer 11. Into said end frame 16 is fastened a screw 17 having a washer 18 whereby a plate 19 is secured thereto for the retention in a fixed location of the switch 21 by means of screws such as 22 therethrough. The switch 21 is of the enclosed snap action type, operated by movement of the pin 23. It constitutes the immediate generator of the electrical output of the instant invention, being arranged to indicate by placing a closed circuit condition on the telegraph line, upon appropriate interrogation by means later to be described, that actuation of the line feed mechanism as well as actual motion of the paper 12 has occurred in the interval since arming of the mechanism (later to be described) has taken place.

Paper guides such as 26 are formed integral with yokes such as 27 and are positionally adjustable on a rod of semicircular section 28 for retaining paper in contact with platen 13 in the usual manner, by the tension of an overbalanced spring 29 operating between a fixed point and the crank arm 31 affixed to rod 28 so as to urge guide 26 into proximity with platen 13.

Figure 4:
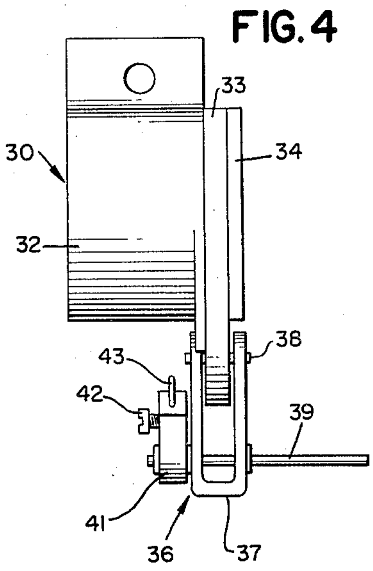
FIG. 4 is a front view of a portion of FIG. 3.
Figure 5:
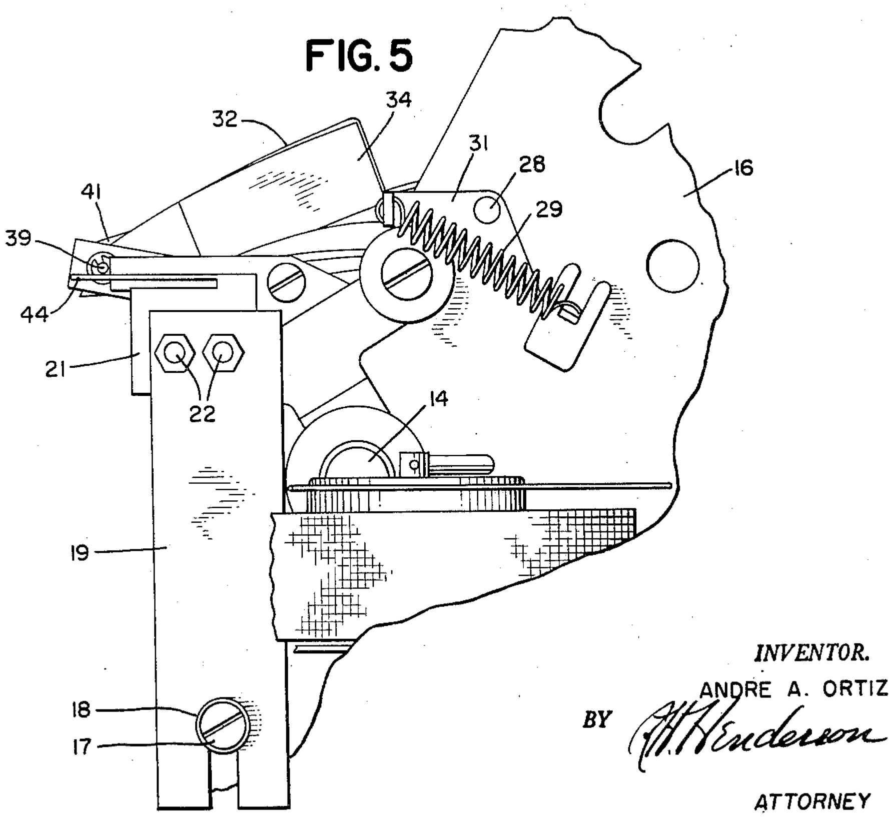
FIG. 5 is a side view of FIG. 3.

On the yoke 27 there is fastened, however, a detector assembly 30 comprising a ramp surface 32, a projecting arm 33 with reenforcing plate 34, and a toggle assembly 36, all seen more clearly in FIG. 4.

In FIG. 4 it will be seen that the toggle assembly 36 is swung away from the ramp surface 32, and comprises a stirrup 37 swingably fastened by means of a pin 38 to arm 33, and having a rod 39 therethrough upon which is swingably mounted a chuck 41 having a screw 42 for retaining a sprag 43 made of wire of small diameter. In the position shown in FIG. 4 with the sprag retracted, paper can be placed between platen 32 and sprag 43, after which the sprag may be allowed to fall onto the paper as shown in FIG. 3, so that the axis of the sprag makes an angle of 20 or 30 degrees with the normal to the surface of the paper at the point of contact.

Figure 3:
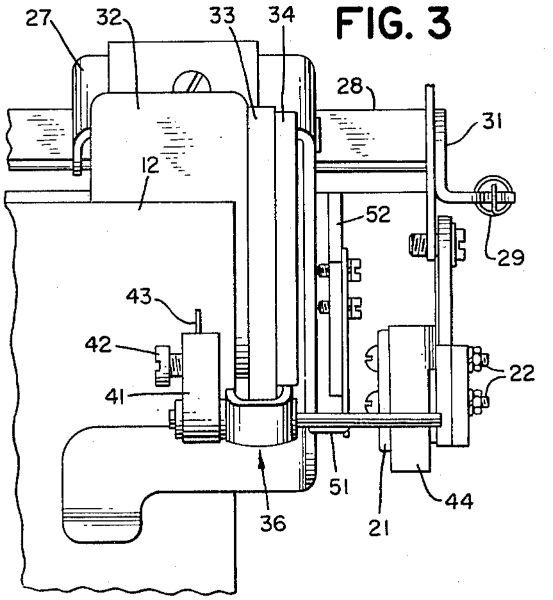
FIG. 3 is a front view of a portion of FIG. 2.

Stirrup 37 is prevented from swinging downwardly further than shown in FIG. 3 by the contact of rod 39 with the leaf 44 overlying switch 21.

Leaf 44 is flexible enough to be bent down so as to actuate switch 21 by its pin 23, but only upon application of pressure greater than the weight of stirrup 37 and chuck 41 can provide.

Such pressure is provided when needed by the plunger 51 on the slide 52 of FIG. 3, which may be seen in FIG. 2. As there seen, a folded over portion 53 of the plunger 51 abuts the rod 39, and the said plunger being affixed to the slide 52, is thus capable of rotating rod 39 forward and downwardly against leaf 44 when advanced by motion of said slide against tension of its return spring 54.

The chuck 41 being thus moved downwardly by this motion of rod 39, its fulcrum, and being free to rest on the record paper by virtue of its weight swinging freely thereabout, the sprag 43 is caused to slide downwardly on the paper 12 (as in FIG. 3), and because of the small aspect angle aforementioned, to wedge thereagainst so as not to return when plunger 51 immediately retreats. By the same downward motion of rod 39, leaf 44 is of course depressed, thus depressing pin 23 to actuate switch 21 agains the tension of its internal return spring, and thus apply to the telegraph line a circuit condition indicative of arming of the detector mechanism. Only upward motion of paper 12 is thereafter capable of releasing the wedge locked condition of sprag 43 so as to allow leaf 44 to spring upward and disengage switch 21, thus causing it to apply to the telegraph line a different circuit condition indicative of actual motion of existing record paper, which is the effect desired.

The arming of the line feed detector mechanism 36 by motion of the slide 52 is effected by means of a rigid assembly securely affixed to a dependent portion 57 of the slide 52 and terminating in an offset arm 58. Slide 52 being retained by shoulder screws 61 through slots 62 is free to slide upon pressure being applied to the arm 58. Such pressure is provided by means of crank 63 journalled in a fixedly mounted bracket 64. The tail of crank 63 is thus so mounted as to be in the line of travel of a lever 65.

The lever 65 is a selected one of a row of similar levers extending across the rear of the conventional telegraph printer, which are actuated to move rearwardly upon receipt of particular function and character signals, each responding to a separate type of such signal or combination of signals which may be arbitrarily prearranged. For example, it has been found convenient in the present instance to utilize the fourth such lever from the right, designated 65, and to provide in well known manner as above described, that it shall operate by moving to the rear only upon receipt of a specific code combination. The combination used is the standard "message ending signal" comprising the code combinations for "fig-H-letters," followed by the letter "W" is and only if such letter occurs before a "space" signal. This sequence is effective to cause arming of the detector, and is usually followed by a station call letter which is effective to disconnect all other printer stations from the line. This is followed either at once or shortly thereafter by a line feed signal rotating the paper on the platen, which is then detected by the invention, as before described.

It will be seen that since the first line feed signal normally follows closely after a station is called and before the text of the message is started, any failure of paper feed is immediately detected and transmitted back to the sending station by the instant invention so that corrective action may be taken at once.

Although the instant invention has been described in terms of a preferred embodiment of a specific illustrative example thereof, it will be apparent to those skilled in the art that various modifications and elaborations may be accomplished without departing however from the essential spirit of the invention. It is therefore intended that the invention shall be limited only by the appended claims.

What is claimed is:

1. In a paper line feed detector for the printing telegraph, detector means hingedly mounted for swinging into wedging contact position with respect to the paper, when the paper is stationary and for swinging out of said wedging contact position upon line feed motion of the paper, resiliently actuable switch means located adjacent to and in the path of travel of said detector means and operable thereby in the wedged position of said detector means to transmit one detectable circuit condition and to transmit another detectable circuit condition when said detector means is out of said wedging contact position, and means responsive to a preselected permutation code sequence to move said detector means into the wedged position.

2. Line feed detector means adapted to be secured to a telegraph page printer and comprising an arcuate table surface for paper support, sprag means positionable against the paper at an acute angle to the normal to the surface thereof and movable by motion of the paper, spring means for applying axial pressure to said sprag means against the paper in the direction of paper motion, switch means operable by motion of said spring means due to sprag motion upon paper movement, and resiliently retractable arming means for deflecting said spring means and positioning said sprag means comprising slide means intermittently advanceable into sprag means contact upon receipt of a predetermined code combination.

3. The invention of claim 1 wherein said detector means comprises a chuck, and a wire sprag secured in said chuck.

4. Line feed and paper detector means comprising strut means for columnar contact with the paper, and laterally disengageable by paper motion switch means operable by strut compression pressure to provide line signals indicative of the degree of strut compression, and means operable upon remote command to apply pressure between said strut means and said switch means.

5. Paper line feed detector means for the printing telegraph comprising substantially pointed paper motion detector means mounted for rotation about a transverse axis and adapted to be pressed against a sheet of paper for detection of paper motion by being rotated thereby, a transverse axis for said detector means comprising a horizontal axle mounted for swinging in a vertical arc and having a lateral extension thereon, switch means operable by the swing of said axle extension and resiliently returnable to an unoperated position, and arming means operable by a telegraph signal to swing said axle into switch operating contact and press said detector means against the paper.

6. The invention of claim 5 wherein said arming means comprises a resiliently retracted slide member momentarily advanceable for detector means arming.

No references cited.